United States Patent Office 2,751,511
Patented June 19, 1956

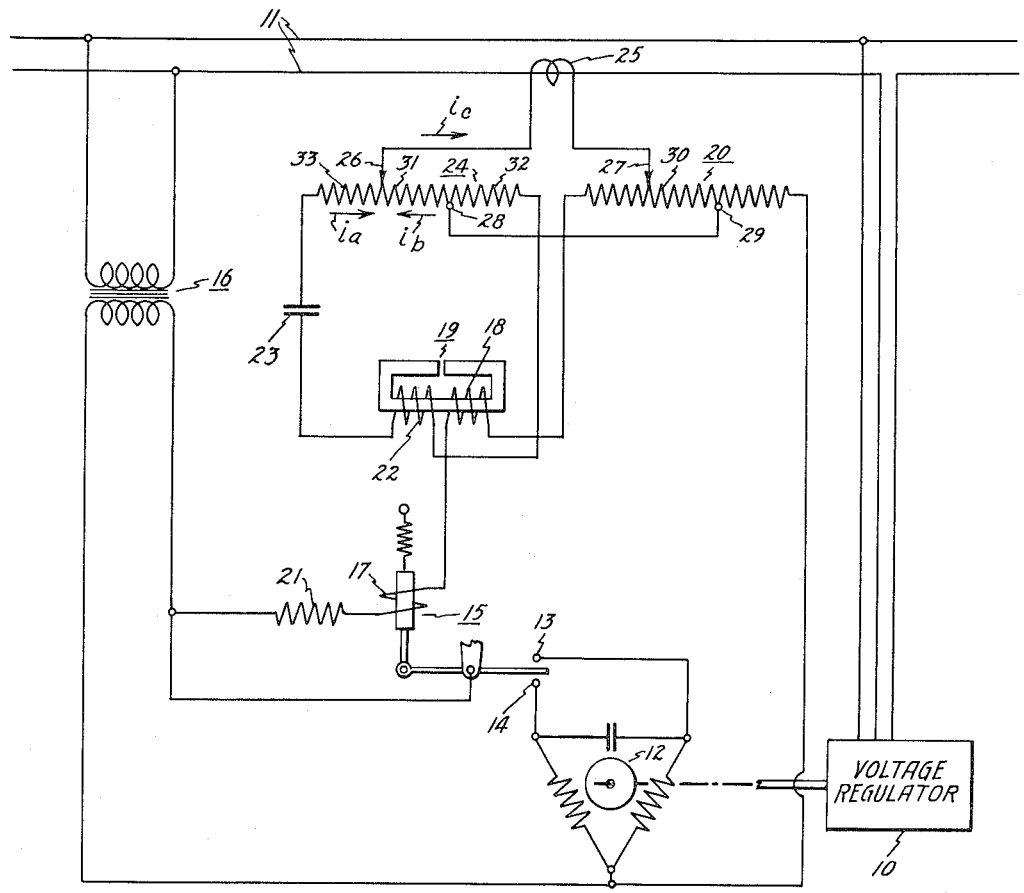

2,751,511

LINE DROP COMPENSATOR

Harry R. West and Morris T. Reese, Pittsfield, Mass., assignors to General Electric Company, a corporation of New York Application August 2, 1955, Serial No. 525,940

7 Claims. (Cl. 307—103)

This invention relates to line drop compensators, and more in particular to an improved line drop compensator providing smoothly adjustable compensation of both negative and positive values.

In its usual application, a line drop compensator is a device which provides compensation for an electric power line voltage regulating device in order that the voltage level at a given point in the line remote from the voltage regulating device, will have a constant predetermined value regardless of load conditions or voltage supply conditions that may exist. In alternating current circuits, the compensation must provide quadrature and in phase components of voltage compensation, since the voltage drop in power lines always contains a resistive component and a reactive component.

A typical line drop compensated voltage regulating system is disclosed in United States Letters Patent No. 2,185,715, which issued on an application of F. M. Starr, and is assigned to the assignee of the present invention. In this system, a voltage regulating relay is provided for controlling the motor drive of an automatic voltage regulating device, and the coil of the relay is connected in series with a reactor, a first potentiometer, and the secondary winding of a potential transformer. The primary winding of the potential transformer is connected to the electrical power line being regulated, in order to provide a voltage proportional to the voltage of the system across the coil of the relay. A series combination of a capacitor and a second potentiometer is connected in parallel with the reactor, and the secondary winding of a current transformer coupled to one conductor of the line is connected to the arms of the two potentiometers. A current proportional to the load current of the transmission system flows through the circuit comprised of a portion of the first potentiometer in series with the parallel combination of one portion of the second potentiometer, and the serially connected reactor, capacitor and other portion of the second potentiometer. The reactances of the reactor and capacitor are substantially equal at the frequency of the transmission line voltage, so that the load circuit of the current transformer is purely resistive. Adjustment of the first potentiometer varies the in phase component of compensation voltage vectorially added to the secondary winding voltage of the potential transformer and applied to the coil of the voltage regulating relay, and adjustment of the second potentiometer varies the quadrature component of compensation voltage vectorially added to the secondary winding voltage of the potential transformer and applied to the coil of the voltage regulating relay. This circuit has the advantage that control of both the in phase and the quadrature components of compensation voltage is made on variable resistors, eliminating the necessity for tapped reactors or other special components. In certain applications, however, it is necessary to provide means for obtaining negative compensation as well as positive compensation. In such cases it is desirable to obtain either positive or negative compensation without the necessity of switching any circuits.

In the past circuits have been disclosed that provide means for obtaining both positive and negative compensation without switching any circuits, but in general these circuits require either tapped reactances or induction regulating devices for varying the quadrature component of compensation.

It is therefore an object of this invention to provide a line drop compensator having means for obtaining both positive and negative values of compensation without the necessity for switching and without tapped reactors or induction regulator devices.

A further object of this invention is to provide a line drop compensator in which true reactance and resistance settings of both positive and negative values are obtainable by means of variable resistors.

Still another object of this invention is to provide an improved line drop compensator having continuous settings to obtain both positive and negative values of compensation, wherein the settings of in phase and quadrature components of compensation are made on variable resistors.

Briefly stated, in accordance with one embodiment of this invention, we provide a line drop compensator providing both negative and positive values of compensation voltage. The magnitude of the in phase component of compensation voltage is controlled by a potentiometer in series with the coil of a voltage regulating relay, and the magnitude of the quadrature component of compensation voltage is controlled by the potentiometer connected in series with a capacitor and reactance means substantially tuned to the frequency of the transmission system. The reactance means has a winding in series with the coil of the voltage regulation relay. Intermediate taps, one on each of the two potentiometers are connected together in order to permit both negative and positive compensation voltage values as a continuous function of the setting of the potentiometers.

This invention will be better understood from the following description taken in connection with the accompanying drawing and its scope will be pointed out in the appended claims.

The drawing is a circuit diagram of an alternating current automatic voltage regulating system containing a preferred embodiment of the line drop compensator of our invention.

Referring now to the diagram therein is illustrated a voltage regulator 10 connected to regulate the voltage of alternating current power line 11. The regulator 10 may be of any conventional type such as, for example, an induction regulator or a step voltage regulator. The regulator 10 is driven by a conventional reversible motor 12 whose direction of operation is controlled by the voltage raising contacts 13 and the voltage lowering contacts 14 of a voltage regulating relay 15. The motor 12 is energized from the secondary winding of a potential transformer 16 by way of the contacts of the voltage regulating relay, and the primary winding of the potential transformer 16 is connected to the power line 11.

The coil 17 of the voltage regulating relay 15 is connected in series with the first winding 18 of a reactor 19 and a first potentiometer 20, the winding 18 and the potentiometer 20 comprising an output circuit of the compensator. This series combination is connected to the secondary winding of the potential transformer 16. If desired a ballast resistor 21 may be connected in series with the coil of the voltage regulating relay. A second winding 22 of the reactor 19 preferably closely inductively coupled to the first winding 18 to minimize leakage reactances is connected in series with a capacitor 23 and a second potentiometer 24. The secondary winding of a current transformer 25 coupled to one of the power lines 11 has one end connected to the arm 26 of the second potentiometer 24, and the other end connected to the arm 27 of the first potentiometer 20. An intermediate tap 28 on the second potentiometer 24 is connected to an intermediate tap 29 on the first potentiometer 20.

The impedances of the capacitor 23 and winding 22 of the reactor 19 are so proportioned that their respective reactances are substantially equal to each other at the rated frequency of the power line voltage so that the voltage induced in the winding 18 of reactor 19 is in quadrature with the secondary winding current of the current transformer 25.

The operation of the line drop compensator of this invention is as follows. The secondary winding current of the current transformer 25 flows through the portion 30 of the first potentiometer 20 between the arm 27 and the tap 29, thence to the tap 28 of the second potentiometer 24. At this point it divides with a portion flowing through the portion 31 of the second potentiometer between the tap 28 and the arm 26, and the other portion of the current flowing through the portion 32 of the second potentiometer 24 to the right of the tap 28, thence through the winding 22 of reactor 19, the capacitor 23, and the portion 33 of the second potentiometer to the left of the arm 26, by Kirchoff's laws:

$$i_c = i_a + i_b \quad (1)$$

and $$i_a(Z_{22} + Z_{23} + R_{32} + R_{33}) = i_b R_{31} \quad (2)$$

where $i_a$ is the current flowing through the portion 33 and 32 of the second potentiometer, the capacitor 23, and the winding 22 of reactor 19, $i_b$ is the current flowing through the portion 31 of second potentiometer 24, $i_c$ is the secondary winding current of the current transformer 25, $Z_{22}$ is the impedance of the winding 22 of reactor 19, $Z_{23}$ is the impedance of the capacitor 23, $R_{32}$ is the resistance of the portion 32 of potentiometer 24, $R_{33}$ is the resistance of the portion 33 of the second potentiometer 24, and $R_{31}$ is the resistance of the portion 31 of the second potentiometer 24. From Equations 1 and 2:

$$i_a = \frac{i_c R_{31}}{Z_{22} + Z_{23} + R_{32} + R_{33} + R_{31}} = \frac{i_c R_{31}}{Z_{22} + Z_{23} + R_{24}} \quad (3)$$

where $R_{24}$ is the resistance of second potentiometer 24. The voltage $V_1$ induced in the winding 18 of the reactor 19 is equal to:

$$V_1 = \frac{N_{18}}{N_{22}} i_a (Z_{22} - R_{22}) \quad (4)$$

where $N_{18}$ is the turns in the winding 18, $N_{22}$ is the turn in the winding 22, and $R_{22}$ is the resistance of the winding 22, assuming negligible load on the winding 18 of reactor 19. Substituting from Equations 3 and 4, $$V_1 = \frac{N_{18}}{N_{22}} i_c R_{31} \left( \frac{Z_{22} - R_{22}}{Z_{22} + Z_{23} + R_{24}} \right) \quad (5)$$

from this expression it is evident that the voltage induced in the winding 18 has a phase angle with respect to the secondary winding current of the current transformer that is dependent upon the phase angle associated with the quantity in the parenthesis, which is a constant, and has a magnitude that is a linear function of the portion of resistance 31 of the second potentiometer 24. As an example, if the resistance of the second potentiometer 24 is 220 ohms and the tap 28 is positioned so that the resistance of resistor 32 is 60 ohms, the impedance of the capacitor is $55 - j325$ ohms, the impedance of the winding 22 of reactor 19 is $40 + j315$ ohms, the resistance of the winding 22 of the reactance 19 is 30 ohms, the number of turns in winding 18 is the same as the number of turns in winding 22, and the current of the current transformer 25 is 0.20 ampere, the voltage induced in the winding 18 may be varied from 0 to 32 volts at a phase angle of 90° with respect to the secondary winding current of the current transformer, and from 0 to 12 volts at a phase angle of −90° with respect to the secondary winding current of the current transformer, depending upon the position of the arm 26 of the second potentiometer 24. The phase angle between the induced voltage of the secondary winding 18 and the current of the secondary winding of the current transformer 25 is made negative by moving the arm 26 of the second potentiometer 24 to the right of the tap 28. In this case the previous equations still are correct with the exception that the current $i_c$ is a negative quantity, and the voltage induced in the winding 18 thus lags the current $i_c$ by 90°. Thus it may be said that the voltage $V_1$ will be in quadrature with the current $i_c$ when the impedance of the winding 22 minus the resistance of the winding 22 and divided by the sum of the impedances of the winding 22 and the capacitor 23 and the resistance of the second potentiometer 24 has no real component.

The voltage drop across portion 30 of the first potentiometer 20 is either in phase or 180° out of phase with the current from the current transformer 25. This voltage drop will be in phase with the current from the current transformer if the arm 27 is to the right of tap 29, and will be 180° out of phase if the arm 27 is to the left of the tap 29. As has been previously disclosed, the voltage induced across the winding 18 of reactor 19 is either 90° leading or 90° lagging the secondary winding current of the current transformer 25. The voltage appearing across the coil 17 and ballast 21 is the vector sum of the voltage output of the potential transformer, the voltage induced in the winding 18 of reactor 19, and the voltage developed across the portion 30 between the arm 27 and the tap 29 of the second potentiometer 20 due to the secondary current of the current transformer 25. Variation in the magnitude of the reactive component of the compensation voltage may be made on the potentiometer 24 without affecting the phase angle of this quadrature component, and variation of the magnitude of the resistive component of the compensation voltage may be made on the first potentiometer 20. In either case these voltages may be made either negative or positive depending on the positions of the arms thereof with respect to the taps.

It will be understood, of course, that, while the form of the invention herein shown and described constitutes a preferred embodiment of the invention, it is not intended herein to illustrate all of the possible equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. Means for obtaining a voltage having variable components in quadrature and in phase with respect to an alternating current, comprising reactance means having first and second inductively coupled windings, a first potentiometer connected in series with said first winding, said first potentiometer and first winding comprising an output circuit, a second potentiometer and capacitor connected in series with said second winding, a source of alternating current connected between the arms of the two said potentiometers, and an intermediate tap on each of said potentiometers, said taps being connected together.

2. Means for obtaining a voltage having variable components in quadrature and in phase with respect to the phase of an alternating current comprising reactance means having first and second closely inductively coupled windings, a first potentiometer connected in series with said first winding, said first potentiometer and first winding comprising an output circuit, a second potentiometer and capacitor connected in series with said second winding, a source of alternating current connected between the arms of said two potentiometers, said capacitor and second winding being proportioned to be substantially tuned to resonance at the frequency of the current of said source, and an intermediate tap on each of said potentiometers, said taps being connected together.

3. Means for obtaining a voltage having variable components in quadrature and in phase with respect to an alternating current comprising reactance means having first and second closely inductively coupled windings, a first potentiometer connected in series with said first winding, said first winding and first potentiometer comprising an output circuit, a second potentiometer and capacitor connected in series with said second winding, a source of alternating current connected between the arms of the two said potentiometers, said second potentiometer, capacitor and second winding being proportioned so that the expression:

$$\frac{Z_{22}-R_{22}}{Z_{22}+Z_{23}+R_{24}}$$

has no real component, where $Z_{22}$ is the impedance of said second winding, $R_{22}$ is the resistance of said second winding, $Z_{23}$ is the impedance of said capacitor, and $R_{24}$ is the resistance of said second potentiometer, and an intermediate tap on each of said potentiometers, said taps being connected together.

4. In a line drop compensator, system means for obtaining in phase and quadrature components of compensation voltage continuously adjustable over a range including both positive and negative values comprising a source of alternating current and a source of alternating potential, having a common source of alternating power, reactor means having first and second closely inductively coupled windings, a first potentiometer, said voltage sensitive means, potential source, first winding, and first potentiometer being connected in series, a second potentiometer, a capacitor, said capacitor and second potentiometer being connected in series with said second winding, said current source being connected between the arms of said potentiometer, an intermediate tap on each of said potentiometers, and a connection between said taps.

5. In a line drop compensator circuit for controlling a voltage regulator of an electrical power line, means for obtaining in phase and quadrature components of compensation voltage continuously adjustable over a range including both positive and negative values comprising a voltage regulating relay, a potential transformer having a primary winding connected to said power line, reactor means having first and second closely inductively coupled windings, an in phase component adjustment potentiometer, said voltage regulating relay, potential transformer, first winding, and in phase adjustment potentiometer being connected in series, a current transformer coupled to said power line, a quadrature component adjustment potentiometer, a capacitor, said capacitor and quadrature component adjustment potentiometer being connected in series with said second winding, said current transformer being connected between the arms of said potentiometers, an intermediate tap on each of said potentiometers, and a connection between said taps.

6. In a line drop compensator circuit for controlling a voltage regulator to maintain a constant voltage at a remote point on an electrical power line, means for obtaining in phase and quadrature components of compensation voltage continuously adjustable over a range including both positive and negative values comprising a voltage regulating relay having a coil and contacts, said contacts being connected to selectively actuate a motor drive for controlling said voltage regulator, a potential transformer having a primary winding connected to said transmission system, reactor means having first and second closely inductively coupled windings, a first potentiometer for controlling the magnitude of the in phase component of said compensation voltage, said voltage regulating relay coil, the secondary winding of said potential transformer, said first winding, and said first potentiometer being connected in series, a second potentiometer for controlling the magnitude of the quadrature component of said compensation voltage, a capacitor, said second winding, second potentiometer, and capacitor being connected in series, a current transformer coupled to said transmission system having a secondary winding connected between the arms of said potentiometer, said capacitor and second winding being proportioned to be substantially tuned to resonance at the frequency of said systems, an intermediate tap on each of said potentiometers, and a connection between said taps.

7. In a line drop compensator circuit for controlling a voltage regulator to maintain a constant voltage at a remote point on an electrical transmission system, means for obtaining in phase and quadrature components of compensation voltage continuously adjustable over a range including both positive and negative values comprising a voltage regulating relay having a coil and contacts, said contacts being connected to selectively actuate the motor drive for controlling said voltage regulator, a potential transformer having a primary winding connected to said transmission system, reactor means having first and second closely inductively coupled windings, a first potentiometer for controlling the magnitude of the in phase component of said compensation voltage, said voltage regulating relay coil, the secondary winding of said potential transformer, said first winding, and said first potentiometer being connected in series, a second potentiometer for controlling the magnitude of the quadrature component of said compensation voltage, the capacitor, said second winding, second potentiometer, and capacitor being connected in series, a current transformer coupled to said transmission system having a secondary winding connected between the arms of said potentiometer, an intermediate tap on each of said potentiometers, and a connection between said taps, said second potentiometer, capacitor and second winding being proportioned so that the expression:

$$\frac{Z_{22}-R_{22}}{Z_{22}+Z_{23}+R_{24}}$$

has no real component, where $Z_{22}$ is the impedance of said second winding, $R_{22}$ is the resistance of said second winding, $Z_{23}$ is the impedance of said capacitor, and $R_{24}$ is the total resistance of said second potentiometer.

No references cited.